(12) United States Patent
Baker et al.

(10) Patent No.: US 12,414,893 B2
(45) Date of Patent: Sep. 16, 2025

(54) DEVICE FOR AUTOMATICALLY RELEASING CREMATED ASHES

(71) Applicant: Sent Into Space Limited, Sheffield (GB)

(72) Inventors: Alex Baker, Sheffield (GB); Chris Rose, Sheffield (GB)

(73) Assignee: Sent Into Space Limited, Sheffield (GB)

( * ) Notice: Subject to any disclaimer, the term of this patent is extended or adjusted under 35 U.S.C. 154(b) by 138 days.

(21) Appl. No.: 18/229,688

(22) Filed: Aug. 3, 2023

(65) Prior Publication Data

US 2024/0041686 A1 Feb. 8, 2024

(30) Foreign Application Priority Data

Aug. 4, 2022 (GB) ........................................ 2211401

(51) Int. Cl.
*A61G 17/08* (2006.01)

(52) U.S. Cl.
CPC .................................... *A61G 17/08* (2013.01)

(58) Field of Classification Search
CPC .......... A61G 17/08; A61G 17/00; B64D 1/16; B64G 1/623; B64G 1/10; B64G 1/2221
See application file for complete search history.

(56) References Cited

U.S. PATENT DOCUMENTS

| | | | | |
|---|---|---|---|---|
| 4,877,203 A | * | 10/1989 | Harden | B64D 1/16 222/400.7 |
| 5,005,784 A | * | 4/1991 | Harden | B64D 1/16 244/136 |
| 5,564,260 A | * | 10/1996 | West | B64D 1/16 141/10 |
| 7,624,485 B2 | * | 12/2009 | Crandlemire | B05B 7/1445 27/1 |
| 8,739,374 B2 | * | 6/2014 | Brown | F41F 1/06 27/1 |

(Continued)

FOREIGN PATENT DOCUMENTS

| | | |
|---|---|---|
| CN | 109132597 A | 1/2019 |
| CN | 111184959 A | 5/2020 |

(Continued)

*Primary Examiner* — William L Miller
(74) *Attorney, Agent, or Firm* — The Webb Law Firm (57) ABSTRACT

A device for automatically releasing cremated ashes, including a chamber for containing cremated ashes; and a release mechanism configured to selectively release cremated ashes contained in the chamber to the external environment. The release mechanism includes an annular outer member, and an inner member at least partially radially inward of the outer member. The outer member includes an outlet from the chamber. The release mechanism is configured to translate the inner member and the outer member relative to each other along a common longitudinal axis from a first relative position, in which release of cremated ashes in the chamber through the outlet is inhibited, to a second relative position, in which release of cremated ashes in the chamber through the outlet is enabled. In the first relative position, the inner member is in contact with the outer member so as to cover the outlet. In the second relative position, the inner member is spaced from the outer member.

17 Claims, 3 Drawing Sheets

(56) References Cited

U.S. PATENT DOCUMENTS

| | | | |
|---|---|---|---|
| 10,327,973 B2 * | 6/2019 | Tibosch | A61G 17/08 |
| 12,097,407 B2 * | 9/2024 | Manser | A63B 37/0075 |
| 2011/0220733 A1 * | 9/2011 | Larson | A61G 17/08 239/722 |
| 2014/0041169 A1 * | 2/2014 | Brown | F41F 1/06 27/1 |
| 2018/0085272 A1 * | 3/2018 | Tibosch | A61G 17/08 |
| 2018/0085273 A1 * | 3/2018 | Laurens | A61G 17/08 |
| 2019/0337619 A1 * | 11/2019 | O'Hara | B64D 1/16 |
| 2023/0044038 A1 * | 2/2023 | Manser | A61G 17/007 |

FOREIGN PATENT DOCUMENTS

| | | |
|---|---|---|
| FR | 3123561 A1 | 12/2022 |
| JP | 2016202524 A * | 12/2016 |
| NL | 9101029 | 1/1993 |
| WO | WO-2020185190 A1 * | 9/2020 |

* cited by examiner

Figure 3

DEVICE FOR AUTOMATICALLY RELEASING CREMATED ASHES

CROSS-REFERENCE TO RELATED APPLICATION

This application claims priority to United Kingdom Patent Application No. 2211401.1 filed Aug. 4, 2022, the disclosure of which is hereby incorporated by reference in its entirety.

BACKGROUND OF THE INVENTION

Field of the Invention

The present teachings relate to a device for automatically releasing cremated ashes, and a method of automatically releasing cremated ashes.

Description of Related Art

In recent years, it has become increasingly popular to scatter the cremated ashes of a deceased person in non-conventional locations, such as in space or high up in Earth's atmosphere.

Devices are known which are configured to elevate the cremated ashes of a deceased person to a high altitude, for example the stratosphere or above, and then release the cremated ashes at this high altitude. To enable relatives and/or friends of the deceased person to watch the cremated ashes being scattered, it is also known to record the ashes as they are released from the device via a camera.

A problem with such known devices is that cremated ashes tend to be released from the device rapidly, resulting in the ash scattering event lasting a relatively short amount of time. The friends and/or relatives of the deceased person commonly wish for a visually appealing and dramatic effect, and may be dissatisfied with the brevity of the ash scattering event.

The present teachings seek to overcome or at least mitigate one or more problems associated with the prior art.

SUMMARY OF THE INVENTION

According to a first aspect of the present teachings, there is provided a device for automatically releasing cremated ashes, comprising: a chamber for containing cremated ashes; and a release mechanism configured to selectively release cremated ashes contained in the chamber to the external environment, the release mechanism comprising an annular outer member, and an inner member at least partially radially inward of the outer member, the outer member comprising an outlet from the chamber. The release mechanism is configured to translate the inner member and the outer member relative to each other along a common longitudinal axis from a first relative position, in which release of cremated ashes in the chamber through the outlet is inhibited, to a second relative position, in which release of cremated ashes in the chamber through the outlet is enabled. In the first relative position, the inner member is in contact with the outer member so as to cover the outlet. In the second relative position, the inner member is spaced from the outer member.

Advantageously, the configuration of the inner member and the outer member helps provide a reliable and robust release mechanism. Moreover, by translating the inner member and the outer member relative to each other along the common longitudinal axis from the first relative position to the second relative position, the rate of release of cremated ashes from the chamber via the outlet can be controlled.

The outer member may comprise an annular sloping surface converging towards the outlet.

Advantageously, the annular sloping surface of the outer member helps maximise the volume of cremated ashes released through the outlet in the second relative position, as well as helping to control the rate of release of cremated ashes from the chamber via the outlet.

The outer member may be at least partially frustoconical.

The annular sloping surface of the outer member may form a maximum angle with the common longitudinal axis in the range of 30 to 60 degrees, preferably in the range of 40 to 50 degrees, for example approximately 45 degrees.

Advantageously, these angles have been found to maximise the volume of ash released through the outlet in second relative position, whilst helping to ensure a controlled release of the ashes through the outlet.

The release mechanism may comprise an actuator arrangement configured to translate the inner member and the outer member relative to each other along the common longitudinal axis from the first relative position to the second relative position.

Advantageously, the actuator arrangement enables automatic controlled release of cremated ashes in the chamber from the device via the outlet.

The actuator arrangement may comprise a linear actuator arranged to engage one of the inner member and the outer member. Actuation of the linear actuator may translate the inner member and the outer member relative to each other along the common longitudinal axis.

Advantageously, the linear actuator provides a reliable and robust means for translating the inner member and the outer member relative to each other from the first relative position to the second relative position.

The linear actuator may be a screw linear actuator.

The linear actuator may comprise a stepper motor.

The device may further comprise a controller configured to control the actuator arrangement.

Advantageously, the controller enables cremated ash to be released from the device automatically without manual input, for example once one or more predetermined conditions have been met. This may enable cremated ash to be released automatically at a desired time, altitude and/or position for example.

The controller may be configured to control the actuator arrangement based on at least one predetermined condition, such as: a predetermined release time; a predetermined altitude of the device; a predetermined global position of the device; and a communication signal received by the controller.

The device may further comprise a controller module releasably mounted to the chamber. The controller may be housed in the controller module.

Advantageously, releasably mounting the controller module to the chamber enables the controller module to be removed from chamber for replacement/inspection/maintenance, as well as improving the modularity of device.

The controller module may provide a closure to an inlet to the chamber when the controller module is mounted to the chamber. The device may be configured such that cremated ashes can be introduced into the chamber via the inlet when the controller module is dismounted from the chamber.

Advantageously, configuring the device such that the controller module provides a closure to the inlet of the chamber, enables cremated ash to be introduced into and contained within the chamber without requiring a separate dedicated closure.

The inner member may comprise an annular sloping surface arranged to contact the outer member in the first relative position.

Advantageously, the annular sloping surface of the inner member helps maximise the volume of cremated ashes released from the device in the second relative position, as well as helping to control the rate of release of cremated ashes from the device.

The inner member may be at least partially dome shaped.

The outlet may be annular. An outer diameter of the annular sloping surface of the inner member may be greater than a diameter of the outlet.

The annular sloping surface of the inner member may form a maximum angle with the common longitudinal axis in the range of 65 degrees to 85 degrees, preferably 70 degrees to degrees, for example approximately 77 degrees.

Advantageously, these angles have been found to maximise the volume of ash released from the device in the second relative position, whilst helping to ensure a controlled release of the ashes from the device.

A distance between the inner member and the chamber may be greater in the second relative position relative to the first relative position.

Advantageously, configuring the device such that the distance between the inner member and the chamber is greater in the second relative position relative to the first relative position may ensure that cremated ash flows over inner member when released from the chamber, which may help to control release of the cremated ash from the device.

The inner member may comprise an annular sloping surface arranged to contact the outer member in the first relative position. Said annular sloping surface may diverge along the common longitudinal axis from a first end thereof adjacent the chamber to an opposed second end thereof.

Advantageously, such a configuration of the annular sloping surface of the inner member may help to control the release of ash from the device.

The outlet may be annular.

Advantageously, such a configuration of the outlet may help ensure that cremated ash is released from the device as a single stream.

The outer member may be fixed relative to the chamber.

Advantageously, fixing the outer member relative to the chamber may help to maximise the volume in the chamber for contained cremated ashes, which may help to improve the compactness of the device.

The outer member may be mounted to a peripheral wall of the chamber, for example, via one or more fasteners.

The outer member or the inner member may comprise an annular sealing member configured to form a seal with the other of the outer member or the inner member in the first relative position.

Advantageously, the sealing member may help to prevent cremated ash from passing through outlet in the first relative position.

The sealing member may be formed from a flexible polymeric material, such as rubber.

The release mechanism may comprise a guiding arrangement configured to inhibit relative rotational movement between the inner member and the outer member about the common longitudinal axis.

Advantageously, the guiding arrangement may help ensure proper alignment between the inner and outer members from the first relative position to the second relative position, as well as helping to enable a linear screw actuator to translate the inner member and the outer member relative to each other along the common longitudinal axis.

The guiding arrangement may be configured to constrain relative movement between the inner member and the outer member to along the common longitudinal axis.

The guiding arrangement may comprise one or more elongate guiding members arranged substantially parallel to, and offset from, the common longitudinal axis. One of the inner member and the outer member may comprise one or more complimentary bores, each arranged to receive a respective one of the one or more guiding members.

Advantageously, such a configuration of the guiding arrangement may help ensure that the relative positions of the inner member and the outer member are accurately controlled.

The inner member may comprise the one or more bores. The one or more bores may pass through a central portion of the inner member.

Advantageously, such a configuration helps to improve the compactness of the device.

The central portion may be radially inward of an annular sloping surface of the inner member arranged to contact the outer member in the first relative position.

The device may further comprise a housing. The chamber and the release mechanism may be at least partially housed within the housing.

Advantageously, the housing helps to protect the chamber and the release mechanism from the external environment.

The housing may be substantially cylindrical.

The chamber may be partially defined by the housing.

The device may further comprise one or more camera mounts mounted to the housing. Each camera mount may be for mounting a camera to the device for capturing images of cremated ash released from the device.

Advantageously, the camera mounts enable cameras to be mounted to the device, for capturing images of cremated ash releasing from the device.

The device may further comprise one or more cameras, each camera mounted to one of the one or more camera mounts.

The device may be configured such that at least one of the one or more camera mounts dismounts from the housing when said at least one camera mount impacts a ground surface at a speed in the range of 3 to 5 meters per second.

Advantageously, such a configuration of the camera mounts helps minimise damage to the housing.

The device may comprise a plurality of the camera mounts. The camera mounts may be spaced radially from each other about a release axis of the device. Cremated ashes may be released from the device in a direction substantially along the release axis, in use.

Advantageously, such a configuration of the camera mounts enables different perspectives of the cremated ash releasing from the device to be captured.

The camera mounts may comprise first and second camera mounts radially spaced from each other about the release axis by an angle in the range of 150 to 210 degrees, preferably 170 to 190 degrees, for example approximately 180 degrees.

The device may comprise a plurality of the camera mounts. The camera mounts may be spaced from each other along a release axis of the device. Cremated ashes may be released from the device in a direction substantially along the release axis, in use.

Advantageously, such a configuration of the camera mounts enables different perspectives of the cremated ash releasing from the device to be captured.

The camera mounts may comprise first and second camera mounts. The first camera mount may be positioned adjacent a first end of the housing. The second camera mount may be positioned adjacent a substantially opposite second end of the housing.

According to a second aspect of the present teachings there is provided a device for automatically releasing cremated ashes, comprising: a chamber for containing cremated ashes; a release mechanism configured to selectively release cremated ashes contained in the chamber to the external environment; a housing arranged to at least partially house the chamber and the release mechanism; and one or more camera mounts mounted to the housing, each camera mount for mounting a camera to the device for capturing images of cremated ash released from the device. Each camera mount may comprise an elongate member extending away from the housing, a first end of the elongate member mounted to the housing. Each camera mount is configured such that a camera is mountable to an opposite second end of the elongate member.

Advantageously, such a configuration of the camera mounts enables cameras to be mounted to the device at positions spaced from the housing, to enhance the field of view of cremated ashes releasing from the device.

The device may further comprise one or more cameras. Each camera may be mounted to one of the one or more camera mounts.

The device may be configured such that at least one of the one or more camera mounts dismounts from the housing when said at least one camera mount impacts a ground surface at a speed in the range of 3 to 5 meters per second.

The device may comprise a plurality of the camera mounts. The camera mounts may be spaced radially from each other about a release axis of the device. Cremated ashes may be released from the device in a direction substantially along the release axis, in use.

The camera mounts may comprise first and second camera mounts radially spaced from each other about the release axis by an angle in the range of 150 to 210 degrees, preferably 170 to 190 degrees, for example approximately 180 degrees.

The device may comprise a plurality of the camera mounts. The camera mounts may be spaced from each other along a release axis of the device. Cremated ashes may be released from the device in a direction substantially along the release axis, in use.

The camera mounts may comprise first and second camera mounts. The first camera mount may be positioned adjacent a first end of the housing. The second camera mount may be positioned adjacent a substantially opposite second end of the housing.

According to a third aspect of the present teachings, there is provided a modular device for automatically releasing cremated ashes, comprising: a housing module including a chamber for containing cremated ashes; an actuator module; and a controller module housing a controller configured to control the actuator module. The actuator module forms part of a release mechanism at least partially housed within the housing module configured to selectively release cremated ashes contained in the chamber to the external environment. The actuator module is releasably mounted to the housing module. The controller module is releasably mounted to the housing module and/or the actuator module.

Advantageously, such a configuration of the device enables rapid replacement/removal of one or more of the housing, the actuator module and the controller module for maintenance and/or inspection.

The release mechanism may be releasably mounted to the housing module.

The controller module may be positioned at or towards a first end of the housing module. The device may be configured to selectively release cremated ashes contained in the chamber to the external environment from an opposed second end of the housing module.

The controller module may provide a closure to an inlet to the chamber when the controller module is mounted to the housing module and/or the actuator module. The device may be configured such that cremated ashes can be introduced into the chamber via the inlet when the controller module is dismounted from the housing module and/or the actuator module.

According to a fourth aspect of the present teachings, there is provided a method of automatically releasing cremated ashes, comprising the steps of:

providing a device comprising a chamber for containing cremated ashes, and a release mechanism configured to selectively release cremated ashes contained in the chamber to the external environment, the release mechanism comprising an annular outer member, and an inner member at least partially radially inward of the outer member, the outer member comprising an outlet from the chamber;

inserting cremated ashes into the chamber; and automatically translating the inner member and the outer member relative to each other along a common longitudinal axis from a first relative position, in which release of the cremated ashes in the chamber through the outlet is inhibited, to a second relative position, in which release of cremated ashes in the chamber through the outlet is enabled.

In the first relative position, the inner member is in contact with the outer member so as to cover the outlet. In the second relative position, the inner member is spaced from the outer member.

BRIEF DESCRIPTION OF THE DRAWINGS

Embodiments are now disclosed by way of example only with reference to the drawings, in which.

DESCRIPTION OF THE INVENTION

Figure 1:
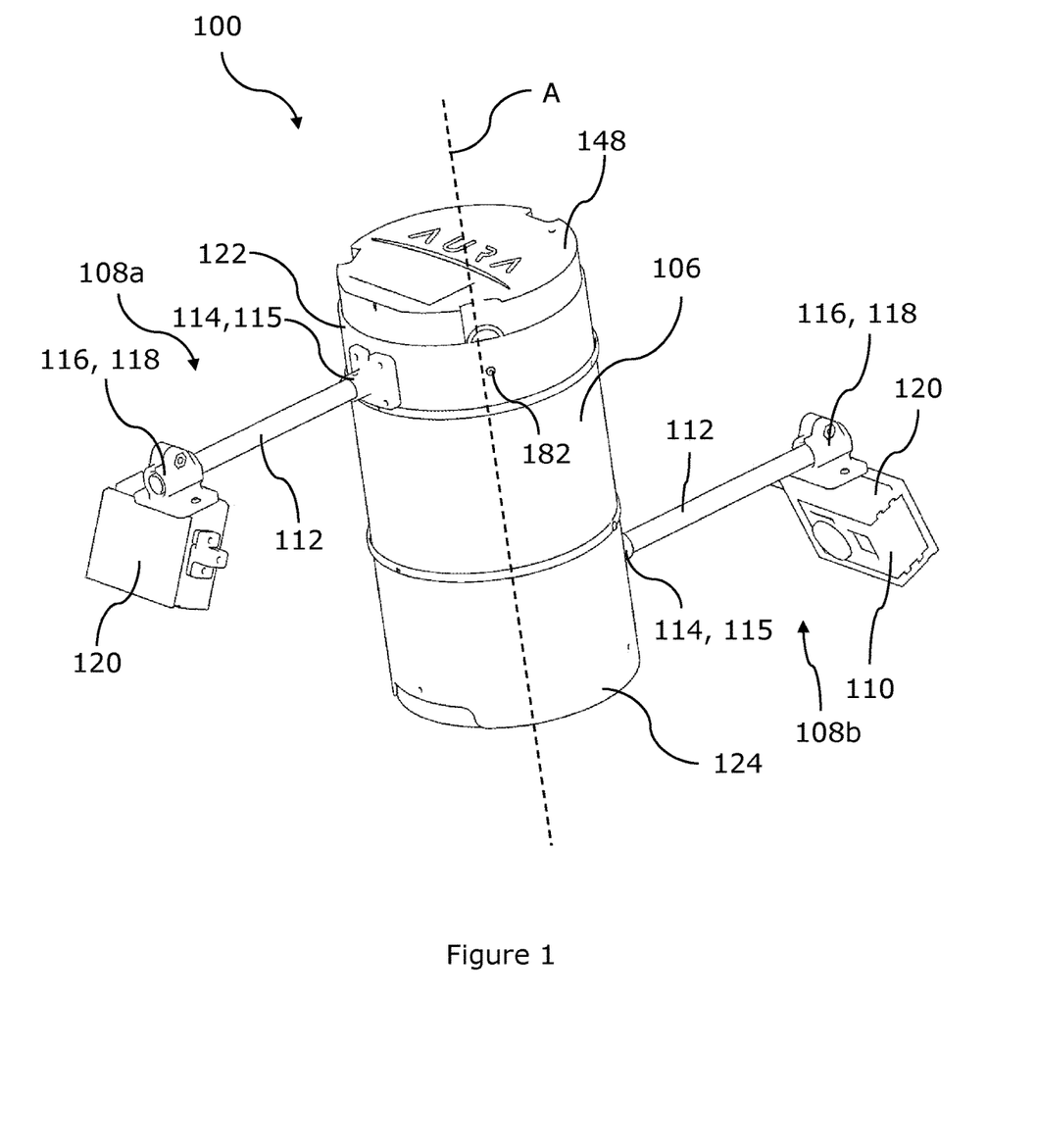
FIG. 1 is an isometric view of a device for automatically releasing cremated ashes according to an embodiment of the present teachings.
Figure 2:
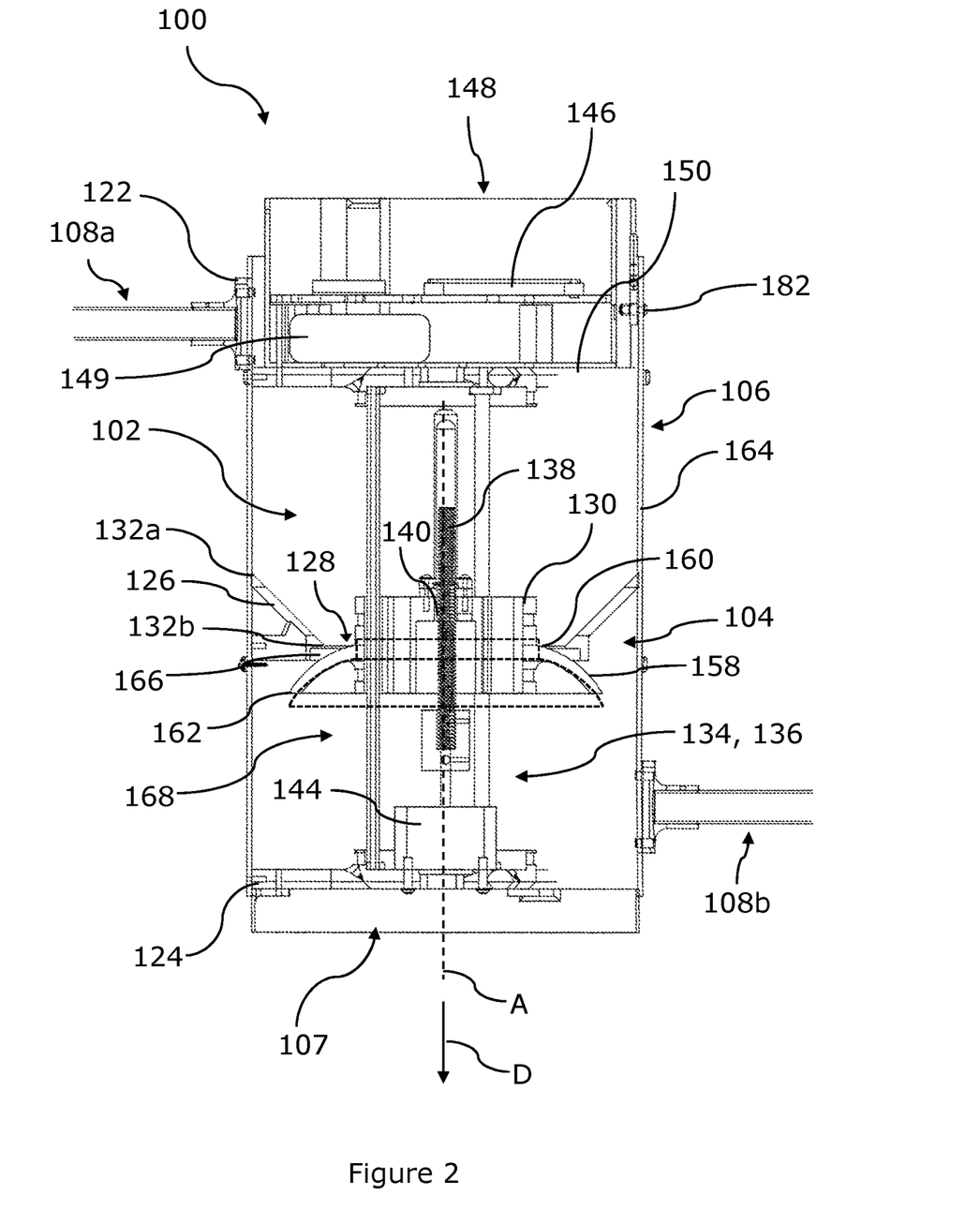
FIG. 2 is a cross-sectional view of the device shown in FIG. 1.

Referring firstly to FIGS. 1 and 2, there is shown a device 100 for automatically releasing cremated ashes. The device 100 includes a chamber 102 for containing cremated ashes, a release mechanism 104 configured to selectively release cremated ashes contained in the chamber 102 to the external environment, and a housing 106 arranged to at least partially house the chamber 102 and the release mechanism 104.

In the illustrated embodiment, the housing 106 is a substantially cylindrical shell. In alternative embodiments (not shown), the housing 106 has any suitable shape, such as a prism with a polygonal profile for example.

In the illustrated embodiment, the housing 106 is formed from a carbon fibre reinforced polymer. In alternative embodiments (not shown), the housing 106 is formed from any suitable material, such as any suitable plastic or metallic material, for example.

The device 100 includes two camera mounts 108a, 108b mounted to the housing 106. In alternative embodiments (not shown), a single camera mount or more than two camera mounts are mounted to the housing 106. Each camera mount 108a, 108b is suitable for mounting a camera 110 to the device 100 for capturing images of cremated ash released from the device 100. In the illustrated embodiment, each camera mount 108a, 108b mounts one camera 110 to the device 100 (only one camera 110 is visible in the view shown in FIG. 1).

The release mechanism 104 is configured to release cremated ashes contained in the chamber 102 from the device 100 substantially along a release axis A (represented via a dashed line in FIGS. 1 and 2).

Figure 3:
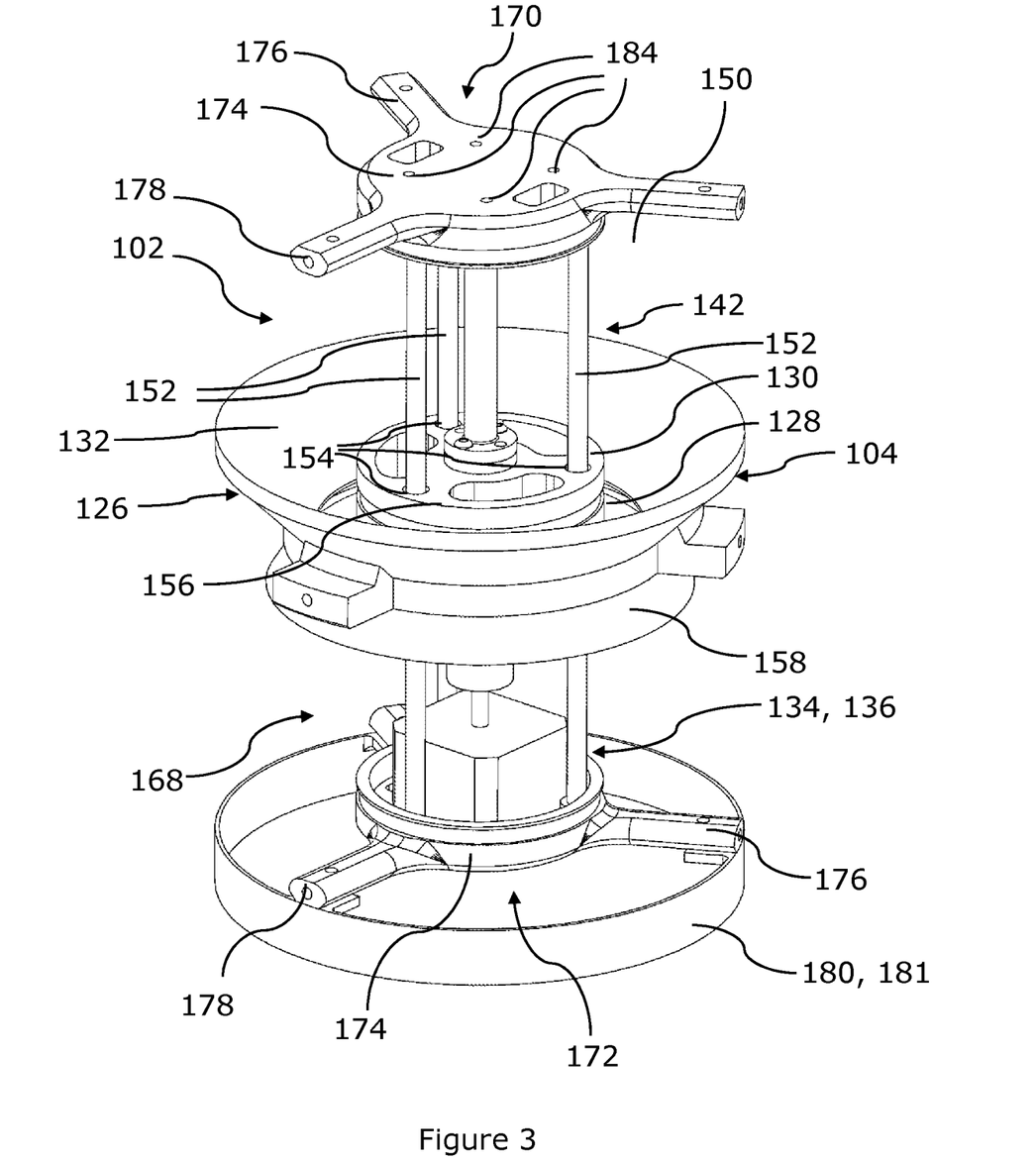
FIG. 3 is an isometric view of internal components of the device shown in FIG. 1.

With reference to FIGS. 2 and 3, the release mechanism 104 includes an annular outer member 126. The outer member 126 includes an outlet 128 from the chamber 102. The release mechanism 104 further includes an inner member 130 at least partially radially inward of the outer member 126. The inner member 130 and the outer member 126 have a common longitudinal axis A, which in the illustrated embodiment corresponds to the release axis A. In alternative embodiments (not shown), the release axis and the common longitudinal axis have different relative positions.

The release mechanism 104 is configured to translate the inner member 130 and the outer member 126 relative to each other along the common longitudinal A axis from a first relative (closed) position (shown in uninterrupted line in FIG. 2), in which release of cremated ashes in the chamber 102 through the outlet 128 is inhibited, to a second relative (open) position (shown schematically in dashed line in FIG. 2), in which release of cremated ashes in the chamber 102 through the outlet 128 is enabled. In the following, "first relative position" and "closed position", and "second relative position" and "open position" shall be used interchangeably.

In the closed position, the inner member 130 is in contact with the outer member 126 so as to cover the outlet 128. In the open position, the inner member 130 is spaced from the outer member 126. In the open position, the inner member 130 is no longer covering the outlet 128 so as to enable cremated ash contained in the chamber 102 to pass through the outlet 128 and release from the device 100.

Advantageously, by translating the inner member 130 and the outer member 126 relative to each other along the common longitudinal axis A from the closed position to the open position, the rate of release of cremated ashes from the chamber 102 via the outlet 128 can be controlled. For example, in the open position, the spacing between the inner member 130 and the outer member 126 can be chosen such that the cremated ashes pass through a resulting gap between the outer member 126 and the inner member 130 at a desired rate of release. Moreover, the rate of release of cremated ashes from the device can be changed without changing the position of the release axis A.

In the illustrated embodiment, cremated ashes contained in the chamber 102 are released to the external environment from an opening 107 in the housing 106 at the second end 124 of the housing 106 when the release mechanism 104 is in the open position.

In the illustrated embodiment, the outlet 128 is annular. In alternative embodiments (not shown), the outlet 128 has any suitable shape.

In the illustrated embodiment, the inner member 130 and the outer member 126 are formed from polylactide (PLA) via an additive manufacturing process. In alternative embodiments (not shown), the inner member 130 and the outer member 126 are formed from any suitable material, such as any suitable plastic or metallic material for example, via any suitable process.

In the illustrated embodiment, a distance between the inner member 130 and the chamber 102 is greater in the open position relative to the closed position. Put another way, the inner member 130 moves away from the chamber 102 in a direction D (represented by an arrow in FIG. 2) as the inner member 130 and the outer member 126 are translated relative to each other along the common longitudinal A axis from the closed position to the open position.

In alternative embodiments (not shown), the distance between the inner member 130 and the chamber 102 is less in the open position relative to the closed position. In such embodiments, the inner member 130 may move towards the chamber 102 (upwards in FIG. 2) as the inner member 130 and the outer member 126 are translated relative to each other along the common longitudinal A axis from the closed position to the open position. In such embodiments, the inner member 130 may be wholly located within the chamber 102 in the open position. In such embodiments, the inner member 130 is modified accordingly.

The chamber 102 is partially defined by the housing 106. In the illustrated embodiment, the chamber 102 is defined by a peripheral wall 164 of the housing 106 and the release mechanism 104. In alternative embodiments, the chamber 102 is not partially defined by the housing. For example, the chamber 102 may be partially defined by a peripheral wall which is separate to the housing 106, and which may be at least partially housed within the housing 106.

The outer member 126 includes an annular sloping surface 132 converging towards the outlet 128. In the illustrated embodiment, the annular sloping surface 132 converges along the common longitudinal axis A from a first end 132a of the annular sloping surface 132 furthest from the outlet 128 to a second end 132b of the annular sloping surface 132 adjacent the outlet 128.

The chamber 102 is partially defined by the annular sloping surface 132. In the illustrated embodiment, the annular sloping surface 132 acts as a funnel, which guides cremated ashes in the chamber 102 towards the outlet 128.

In the illustrated embodiment, the outer member 126 is at least partially frustoconical. In alternative embodiments (not shown), the outer member 126 has any suitable shape.

The annular sloping surface 132 of the outer member 126 forms a maximum angle with the common longitudinal axis A in the range of 30 to 60 degrees, preferably in the range of 40 to 50 degrees. In the illustrated embodiment, the annular sloping surface 132 of the outer member 126 forms a maximum angle with the common longitudinal axis A of approximately 45 degrees. Advantageously, these angles have been found to ensure that substantially all of the cremated ash in the chamber 102 is released through the outlet 128 at a desired controlled rate in the open position.

In the illustrated embodiment, the annular sloping surface 132 has a substantially straight profile as shown in FIG. 2. In alternative embodiments (not shown), the annular sloping surface 132 has any suitable profile.

In alternative embodiments (not shown), the outer member 126 does not include the annular sloping surface 132, and, for example, may instead include a surface substantially parallel to or normal to the common longitudinal axis A.

In the illustrated embodiment, the common longitudinal axis A is an axis of rotational symmetry of the annular sloping surface 132 of the outer member 126.

The inner member 130 includes an annular sloping surface 158 arranged to contact the outer member 126 in the closed position. In the illustrated embodiment, the inner member 130 is partially dome shaped. The annular sloping surface 158 has the shape of a truncated dome. In alternative embodiments (not shown), the annular sloping surface 158 is dome-shaped, or has any suitable sloping shape. For example, the annular sloping surface 158 may have a substantially straight profile.

In the illustrated embodiment, cremated ash passing through the outlet 128 in the open position flows over the annular sloping surface 158 of the inner member 130 before exiting the device 100. As such, the inner member 130 impedes the flow of cremated ash from the device 100 in the open position, helping to control the rate of release of cremated ash from the device 100.

In the illustrated embodiment, the common longitudinal axis A is an axis of rotational symmetry of the annular sloping surface 158 of the inner member 130.

In the illustrated embodiment, an outer diameter of the annular sloping surface 158 of the inner member 130 is greater than a diameter of the outlet 128. As such, the annular sloping surface 158 projects radially outward from the outlet 128, for example as shown in FIGS. 2 and 3. Advantageously, this helps ensure that cremated ash flows over a greater area of the inner member 130 when cremated ash is released from the device 100, to help control the release of the cremated ash from the device 100.

The annular sloping surface 158 of the inner member 130 forms a maximum angle with the common longitudinal axis A in the range of 65 degrees to 85 degrees, preferably 70 degrees to 80 degrees. In the illustrated embodiment, the annular sloping surface 158 of the inner member 130 forms a maximum angle with the common longitudinal axis A of approximately 77 degrees. Advantageously, these angles have been found to maximise the volume of ash released from the device 100 in the open position, whilst helping to ensure a controlled release of the ashes from the device 100.

The annular sloping surface 158 of the inner member 130 forms a minimum angle with the common longitudinal axis A in the range of 20 degrees to 40 degrees, preferably 25 degrees to 35 degrees. In the illustrated embodiment, the annular sloping surface 158 of the inner member 130 forms a minimum angle with the common longitudinal axis A of approximately 30 degrees.

In the illustrated embodiment, the annular sloping surface 158 of the inner member 130 diverges along the common longitudinal axis A from a first end 160 of the annular sloping surface 158 adjacent the chamber 102 to an opposed second end 162 of the annular sloping surface 158. In the illustrated embodiment, the outer member 126 is interposed between the chamber 102 and the second end 162 of the annular sloping surface 158.

In alternative embodiments (not shown), in which the distance between the inner member 130 and the chamber 102 is less in the open position relative to the closed position, the annular sloping surface 158 of the inner member 130 converges along the common longitudinal axis A from a first end thereof adjacent the chamber 102 to an oppose second thereof, for example furthest from the chamber 102.

The outer member 126 is fixed relative to the chamber 102. In the illustrated embodiment, the outer member is mounted to the peripheral wall 164 of the chamber 102, for example, via one or more fasteners, such as bolts.

In alternative embodiments (not shown), the inner member 130 is instead fixed relative to the chamber 102.

The outer member 126 includes an annular sealing member 166 configured to form a seal with the inner member 130 in the closed position. The annular sealing member 166 may be formed from a flexible polymeric material, such as rubber for example. In the illustrated embodiment, the annular sealing member 166 is arranged adjacent to and around the outlet 128.

In alternative embodiments (not shown), the inner member 130 instead includes the annular sealing member 166.

The release mechanism 104 includes an actuator arrangement 134 configured to translate the inner member 130 and the outer member 126 relative to each other along the common longitudinal axis A from the closed position to the open position.

In the illustrated embodiment, the actuator arrangement 134 is fixed relative to the outer member 126, and is configured to translate the inner member 130 relative to the outer member 126. In alternative embodiments (not shown), the actuator arrangement 134 is fixed relative to the inner member 130, and is configured to translate the outer member 126 relative to the inner member 130.

In the illustrated embodiment, the actuator arrangement 134 includes a linear actuator 136 arranged to engage the inner member 130. Actuation of the linear actuator 136 translates the inner member 130 and the outer member 126 relative to each other along the common longitudinal axis A.

The linear actuator 136 is fixed relative to the outer member 126. In the illustrated embodiment, the linear actuator 136 and the outer member 126 are both fixed relative to the housing 106. Actuation of the linear actuator 136 translates the inner member 130 relative to the housing 106.

In the illustrated embodiment, the linear actuator 136 is a screw linear actuator configured to rotate a screw 138 about an axis parallel to the common longitudinal axis A. The screw 138 is received in a threaded bore 140 of the inner member 130. The release mechanism 104 includes a guiding arrangement 142, discussed in more detail in the following, configured to inhibit relative rotational movement between the inner member 130 and the outer member 126 about the common longitudinal axis A. As such, rotation of the screw 138 results in the inner member 130 translating relative to the outer member 126 along the common longitudinal axis A from the closed position to the open position.

In the illustrated embodiment, the linear actuator 136 incudes a stepper motor 144 configured to rotate the screw 138. Advantageously, the stepper motor 144 enables precise control of the release mechanism 104. In alternative embodiments (not shown), the linear actuator 136 includes any suitable motor.

In alternative embodiments (not shown), the linear actuator 136 does not engage the inner member 130, and instead engages the outer member 126, such that actuation of the linear actuator 136 translates the inner member 130 and the outer member 126 relative to each other along the common longitudinal axis A. In such embodiments, the linear actuator 136 may be fixed relative to the inner member 130 instead of the outer member 126, for example, the inner member 130 and the linear actuator 136 may both be fixed relative to the housing 106. Actuation of the linear actuator 136 may translate the outer member 126 relative to the housing 106.

In alternative embodiments (not shown), the actuator arrangement 134 includes any suitable actuator configured to translate the inner member 130 and the outer member 126 relative to each from the closed position to the open position, for example, a hydraulic or pneumatic actuator.

In the illustrated embodiment, the guiding arrangement 142 is configured to constrain relative movement between the inner member 130 and the outer member 126 to along the common longitudinal axis A. The guiding arrangement 142 includes three elongate guiding members 152 arranged substantially parallel to, and offset from, the common longitudinal axis A. In alternative embodiments (not shown), the guiding arrangement 142 instead includes one, two or more than three guiding members 152.

The guiding members 152 are fixed relative to the outer member 126.

The inner member 130 includes complimentary bores 154, each arranged to receive a respective one of the guiding members 152. The bores 154 and the guiding members 152 are configured such that the inner member 130 can translate relative to the guiding members 152 along the common longitudinal axis A.

In the illustrated embodiment, a linear bearing (not shown) is mounted within each of the bores 154. Each linear bearing is interposed between the respective bore 154 and the respective guiding member 152. Advantageously, the linear bearings help to reduce friction between the guiding members 152 and the inner member 130, and thus help to provide smooth relative translation between the inner member 130 and the guiding arrangement 142. In the illustrated embodiment, the bores 154 pass through a central portion 156 of the inner member 130. The central portion 156 is radially inward of the annular sloping surface 158 of the inner member 130. Advantageously, such a configuration helps to improve the compactness of the device 100.

In alternative embodiments (not shown), the guiding members 152 are fixed relative to the inner member 130. In such embodiments, the guiding members 152 may be arranged so as to be received in complimentary bores 154 in the outer member 126, and such that the outer member 126 can translate relative to the guiding members 152 along the common longitudinal axis A.

In alternative embodiments (not shown), the device 100 includes any suitable guiding arrangement 142. Alternatively, in embodiments in which the inner member 130 and the outer member 126 are translated relative to each from the closed position to the open position without the screw 138, the device 100 may not include the guiding arrangement 142.

The device 100 further includes a controller 146 configured to control the actuator arrangement 134. In the illustrated embodiment, the controller 146 includes a global positioning device (e.g. GPS), an altimeter, and a communication device for receiving wireless communication signals (e.g. 5G).

The controller 146 may be configured to control the actuator arrangement 134 based on at least one predetermined condition, such as: a predetermined release time; a predetermined altitude of the device 100; a predetermined global position of the device 100; and a communication signal received by the controller 146. For example, the controller 146 may be configured to control the actuator arrangement 134 to translate the inner member 130 and the outer member 126 relative to each other along the common longitudinal axis A from the closed position to the open position based on the at least one predetermined condition.

With further reference to FIG. 1, each camera mount 108a, 108b includes an elongate member 112 extending away from the housing 106. Each elongate member 112 includes a first end 114 mounted to the housing 106. Each elongate member 112 includes a second end 116 opposite to the first end 114. Each elongate member 112 is configured such that a camera 110 is mountable to the second end 116 of the elongate member 112.

In the illustrated embodiment, each elongate member 112 is a rod. In alternative embodiments, each elongate member 112 has any suitable shape.

In the illustrated embodiment, each camera mount 108a, 108b includes a bracket 118 secured to the second end 116 of the elongate member 112. The bracket 118 is attached to one of the cameras 110 via a camera casing 120 arranged to at last partially encase the respective camera 110. In alternative embodiments (not shown), each bracket 118 is directly secured to one of the cameras 110.

The device 100 is configured such that the camera mounts 108a, 108b dismount from the housing 106 when the camera mounts 108a, 108b impact a ground surface at a speed in the range of 3 to 5 meters per second.

In the illustrated embodiment, the first end 114 of each elongate member 112 is mounted to the housing 106 via a connector 115 secured to the housing 106. Each connector 115 includes a crumple zone configured to release the respective elongate member 112 from the connector 115, and thus from the housing 106, when the respective camera mount 108a, 108b impacts a ground surface at a speed in the range of 3 to 5 meters per second.

Advantageously, such a configuration of the camera mounts 108a, 108b helps to minimise damage to the housing 106, for example when the device 100 is returning to the ground from a high-altitude (e.g. the stratosphere or above), for example via a parachute or other decelerating means.

In alternative embodiments (not shown), the device 100 includes a plurality of cables, each cable connecting one of the camera mounts 108a, 108b to the housing 106. For example, a first end of each cable may be secured to the respective camera casing 120 and a second end of each cable may be secured to the housing 106 via one of the fasteners 182. Advantageously, the cables help ensure that the camera mounts 108a, 108b remain connected to the housing 106 after they are dismounted from the housing 106, to limit a separation distance between the camera mounts 108a, 108b and the housing 106 after the device 100 has impacted a ground surface, for example.

In alternative embodiments (not shown), the device 100 is configured such that the camera mounts 108a, 108b dismount from the housing 106 when the camera mounts 108a, 108b impact a ground surface at a speed in the range of 3 to 5 meters per second via any suitable means.

In alternative embodiments (not shown), the device 100 is configured such that one or more of the camera mounts 108a, 108b do not dismount from the housing 106 when said one or more camera mounts 108a, 108b impact a ground surface at a speed in the range of 3 to 5 meters per second. In the illustrated embodiment, the camera mounts 108a, 108b are spaced radially from each other about the release axis A. In the illustrated embodiment, the camera mounts 108a, 108b include a first camera mount 108a and a second camera mount 108b. The first camera mount 108a and the second camera mount 108b are spaced radially from each other about the release axis A by an angle in the range of 150 to 210 degrees, preferably 170 to 190 degrees. In the illustrated embodiment, the first camera mount 108a and the second camera mount 108b are spaced radially from each other about the release axis A by approximately 180 degrees.

In alternative embodiments (not shown), the camera mounts 108a, 108b are not spaced radially from each other about the release axis A.

In the illustrated embodiment, the camera mounts 108a, 108b are spaced from each other along the release axis A. In the exemplary embodiment shown in FIGS. 1 and 2, the first camera mount 108a is positioned adjacent a first end 122 of the housing 106, and the second camera mount 108b is positioned adjacent a substantially opposite second end 124 of the housing 106.

In alternative embodiments (not shown), the camera mounts 108a, 108b are not spaced from each other along the release axis A.

The device 100 is modular and includes a plurality of modules, each module releasably mounted to at least one other module. By 'releasably mounted', it is intended to mean that each module can be mounted to and dismounted from at least one other module by using only hand tools (e.g. screw driver, allen key, or pliers) or no tools at all.

The plurality of modules includes a controller module 148, an actuator module 168, and a housing module 106. In the illustrated embodiment, the housing module corresponds to the housing 106.

In the illustrated embodiment, the actuator module 168 includes the actuator arrangement 134, the inner member 130 and the guiding arrangement 142.

The actuator module 168 is releasably mounted to the housing module 106.

With reference to FIG. 3, the actuator module 168 further includes a first mounting member 170 and a second mounting member 172. The actuator module 168 is releasably mounted to the first end 122 of the housing module via the first mounting member 170. The actuator module 168 is releasably mounted to the second end 124 of the housing module 106 via the second mounting member 172.

The first and second mounting members 170, 172 each include a hub 174 and three legs 176 extending radially outward from the hub 174. Each leg 176 is mounted to the housing module 106 via a fastener, such as a bolt, passing through the peripheral wall 164 of the housing module 106 and received in a (e.g. threaded) hole 178 in the leg 176. In alternative embodiments (not shown), each mounting member 170, 172 includes one, two or more than three legs 176.

In the illustrated embodiment, the guiding arrangement 142 is mounted to the hubs 174 of the first mounting member 170 and the second mounting member 172. The actuator arrangement 134 is mounted to the hub 174 of the second mounting member 172. The legs 176 of the second mounting member 172 are mounted to an annular member 180 receivable within the housing module 106 so as to form a snug fit with an internal surface of the peripheral wall 164. By 'snug fit' it is intended to mean that a peripheral exterior surface 181 of the annular member 180 abuts against the internal surface of the peripheral wall 164 when the annular member 180 is received in the housing module 106. The annular member 180 helps increase the rigidity of the housing module 106 at the second end 124 thereof.

The controller module 148 houses the controller 146. The controller module 148 also houses other components such as a battery 149 arranged to power the controller 146 and the actuator arrangement 134.

The controller module 148 is releasably mounted to the chamber 102. In the illustrated embodiment, the controller module 148 is releasably mounted to the housing module 106 and the actuator module 168. The controller module 148 is positioned at or towards the first end 122 of the housing module 106

The controller module 148 is releasably mounted to the first end 122 of the housing module 106 via a plurality of fasteners 182, such as bolts, passing through the peripheral wall 164 of the housing module 106 and bores in the controller module 148. The controller module 148 is releasably mounted to the actuator module 168 via a plurality of fasteners (not shown), such as bolts, passing through the controller module 148 and bores 184 in the hub 174 of the first mounting member 170.

In alternative embodiments (not shown), the controller module 148 is mounted to only one of the housing module 106 or the actuator module 168.

The controller module 148 provides a closure to an inlet 150 to the chamber 102 when the controller module 148 is mounted to the chamber 102. The device 100 is configured such that cremated ashes can be introduced into the chamber 102 via the inlet 150 when the controller module 148 is dismounted from the chamber 102. In the illustrated embodiment, the inlet 150 is formed between adjacent legs 176 of the first mounting member 170.

In the illustrated embodiment, the release mechanism 104 is releasably mounted to the housing module 106. The outer member 126 is releasably mounted to the housing module 106 via one or more fasteners (not shown), such as bolts. As previously described, the inner member 130 and the guiding arrangement 142 form part of the actuator module 168, which is releasably mounted to the housing module 106.

In the foregoing description, the controller module 148, the actuator module 168, and the housing module 106 are releasably mounted to the corresponding modules via fasteners. In alternative embodiments (not shown), one or more of the controller module 148, the actuator module 168, and the housing module 106 are releasably mounted to the corresponding modules via any suitable releasable mounting arrangement, such as a bayonet-type fitting, for example.

In the following, a method of automatically releasing cremated ashes via the device 100 will be outlined.

In a first step, cremated ashes are introduced into the chamber 102.

Subsequently, the device 100 may be elevated, for example, to the stratosphere or above. The device 100 may be elevated via a self-propelled vehicle, such as an aircraft or a rocket, for example. The aircraft may be a lighter-than-air aircraft such as a weather balloon, for example.

In a subsequent step, the inner member 130 and the outer member 126 are automatically translated relative to each other along the common longitudinal axis A from the closed position to the open position, to enable the cremated ashes contained in the chamber 102 to release from the device 100 via the outlet 128.

In the foregoing description, the device 100 is configured to automatically release cremated ashes to the external environment. In alternative embodiments (not shown), the device 100 is configured to automatically release any suitable granular material or any suitable liquid contained in the chamber 102 to the external environment via the outlet 128.

In the foregoing description, the outer member 126 includes the outlet 128. In alternative embodiments (not shown), the outer member 126, suitably modified, includes a plurality of outlets 128 from the chamber 102. In such embodiments, the inner member 130, suitably modified, may contact the outer member 126 so as to cover the outlets 128 in the closed position. Alternatively, the release mechanism 104 may include a plurality of inner members 130, each configured to contact the outer member 126 so as to cover one of the outlets 128 in the closed position. The plurality of outlets 128 may be distributed radially about the common longitudinal axis A.

The invention claimed is:

1. A device for automatically releasing cremated ashes, comprising:
    a chamber for containing the cremated ashes; and
    a release mechanism configured to selectively release the cremated ashes contained in the chamber to the external environment, the release mechanism comprising an annular outer member, and an inner member at least partially radially inward of the outer member, the outer member comprising an outlet from the chamber,
    wherein the release mechanism is configured to translate the inner member and the outer member relative to each other along a common longitudinal axis from a first relative position, in which release of the cremated ashes in the chamber through the outlet is inhibited, to a second relative position, in which release of the cremated ashes in the chamber through the outlet is enabled, wherein, in the first relative position, the inner member is in contact with the outer member so as to cover the outlet, wherein, in the second relative position, the inner member is spaced from the outer member, and wherein the inner member comprises an annular sloping surface arranged to contact the outer member in the first relative position.

2. The device of claim 1, wherein the outer member comprises an annular sloping surface converging towards the outlet.

3. The device of claim 2, wherein the annular sloping surface of the outer member forms a maximum angle with the common longitudinal axis in the range of 30 to 60 degrees.

4. The device of claim 1, wherein the release mechanism comprises an actuator arrangement configured to translate the inner member and the outer member relative to each other along the common longitudinal axis from the first relative position to the second relative position.

5. The device of claim 4, wherein the actuator arrangement comprises a linear actuator arranged to engage one of the inner member and the outer member, and wherein actuation of the linear actuator translates the inner member and the outer member relative to each other along the common longitudinal axis.

6. The device of claim 4, further comprising a controller configured to control the actuator arrangement.

7. The device of claim 6, further comprising a controller module releasably mounted to the chamber, wherein the controller is housed in the controller module.

8. The device of claim 1, wherein the annular sloping surface of the inner member forms a maximum angle with the common longitudinal axis in the range of 65 degrees to 85 degrees.

9. The device of claim 1, wherein a distance between the inner member and the chamber is greater in the second relative position relative to the first relative position.

10. The device of claim 1, wherein the outer member is fixed relative to the chamber.

11. The device of claim 1, wherein the outer member or the inner member comprises an annular sealing member configured to form a seal with the other of the outer member or the inner member in the first relative position.

12. The device of claim 1, wherein the release mechanism comprises a guiding arrangement configured to inhibit relative rotational movement between the inner member and the outer member about the common longitudinal axis.

13. The device of claim 12, wherein the guiding arrangement comprises one or more elongate guiding members arranged substantially parallel to, and offset from, the common longitudinal axis, and wherein one of the inner member and the outer member comprises one or more complimentary bores, each arranged to receive a respective one of the one or more guiding members.

14. The device of claim 13, wherein the inner member comprises the one or more bores, the one or more bores passing through a central portion of the inner member.

15. The device of claim 1, further comprising a housing, wherein the chamber and the release mechanism are at least partially housed within the housing.

16. The device of claim 15, further comprising one or more camera mounts mounted to the housing, each camera mount for mounting a camera to the device for capturing images of the cremated ashes released from the device.

17. A method of automatically releasing cremated ashes, comprising the steps of:
    providing the device of claim 1;
    inserting the cremated ashes into the chamber; and
    automatically translating the inner member and the outer member relative to each other along the common longitudinal axis from the first relative position to the second relative position.

* * * * *